Patented Jan. 3, 1939

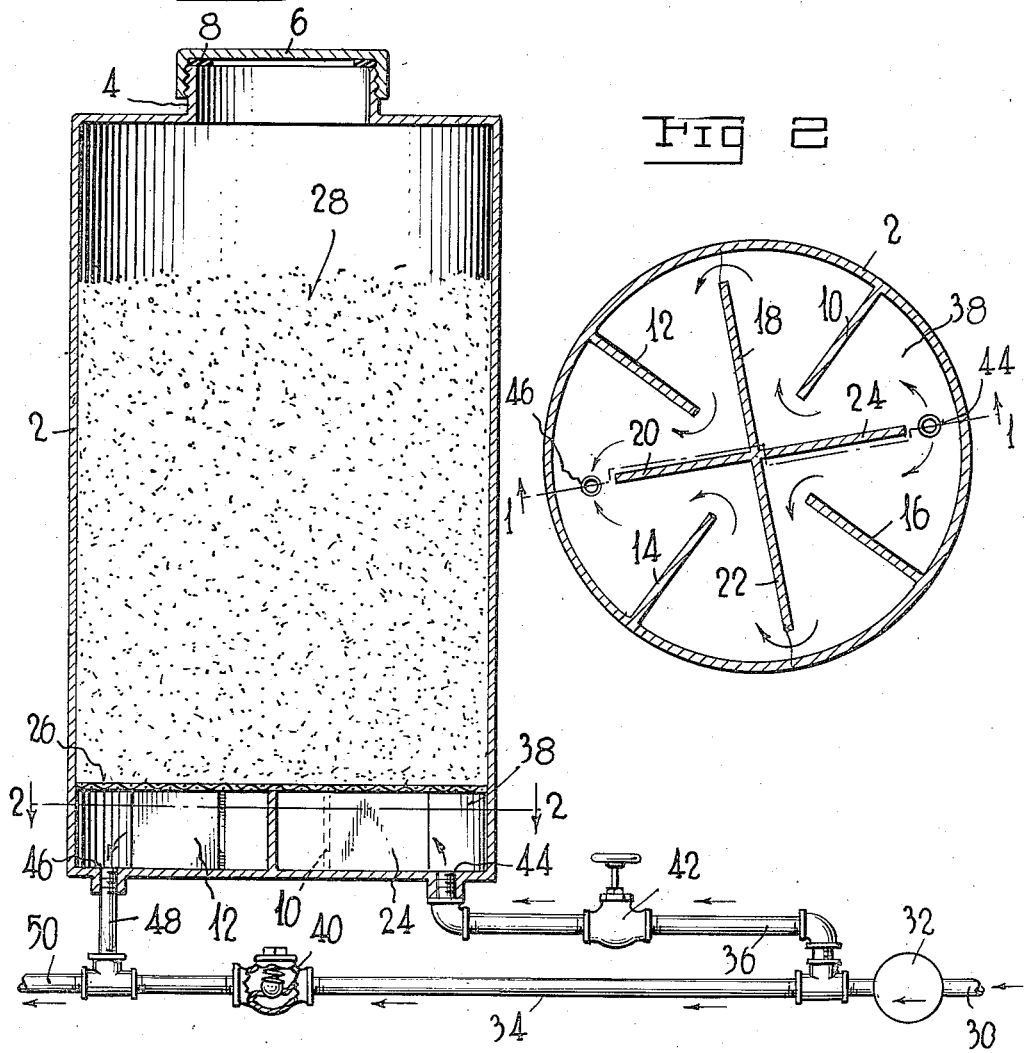

2,142,947

UNITED STATES PATENT OFFICE 2,142,947

MIXING APPARATUS

Charles R. Kretzschmar, Fairlawn, and August W. Ofeldt, Hackensack, N. J.

Application April 25, 1938, Serial No. 204,248

4 Claims. (Cl. 299—84)

This invention relates to a mixing apparatus and more particularly to a mixing device including a mixing container and piping arrangement for forming and feeding solutions of predetermined controlled strength, for use particularly in connection with or a part of a cleaning machine adapted for the cleaning of trucks, busses, machinery, buildings and other devices of a varied nature.

In accordance with the present general practice, solutions for cleaning purposes are prepared by dissolving a cleaning compound, such as Oakite, Magnus, Wyandotte, or the prepared chemicals desired for use, in water by hand mixing in a tank or container. The operation is generally carried out by placing an amount of the chemical which will be required for immediate use, or sufficient for a few hours' operation, in a tank and adding water to the chemical and stirring by hand until a solution of somewhat indeterminate strength is prepared. The cleaning machine is then operated until the batch of cleaning solution is exhausted and the cleaning operation is stopped until a new batch of cleaning solution can be made up. It frequently happens that much time is lost in halting the cleaning operation and shutting down the machine while the new solution is being made up. The cleaning compounds are usually in powder or paste form and the rate of solution of these materials is slow. Furthermore, the solutions produced in this manner are not homogeneous or of constant strength or concentration.

From the mixing tank, the solution, as above prepared, is pumped into a boiler in which the solution is brought to a pressure of about 100 pounds' pressure and from which the solution is fed through a steam hose and nozzle to the job or the surface to be cleaned.

One of the objects of the present invention is to provide a novel form of mixing apparatus in which the mixing step or the solution forming step may be carried on continuously so that it is unnecessary to halt the cleaning operation for the production of the cleaning solution of the required strength.

Another object of the invention is to provide a method or system for the handling of cleaning solutions in which the use of a pump for the pumping of the cleaning solution after it is prepared is avoided. In the system as hereinafter described, clean water having no chemicals dissolved therein is pumped directly to the mixing tank in which the water dissolves the chemical or cleaning compound by passing through a baffle arrangement, the resulting solution being mixed through a piping arrangement with a controlled amount of water in the line so as to obtain a mixture of the desired strength. No additional pump for pumping the chemical solution is required.

Another object of the invention is to provide a form of mixing apparatus for the preparation of chemical solutions in which manual labor is largely eliminated without the use of mechanical stirrers and in which a chemical solution is continuously formed, so that the cleaning operation in which the cleaning solution is used may be carried on continuously.

Another object of the invention is to provide a mixing device for making chemical solutions by which solutions of a predetermined strength may be formed through a valve-controlled piping arrangement in which water is fed proportionally to the flow of chemical solution so as to provide a cleaning solution of the desired strength.

A further object of the invention is to provide a saturating tank having a baffle arrangement serving to direct the flow of water through a sufficient area of the chemical material so that the solution leaving the tank is substantially saturated, and thereby permits proportioning the flow of water and the saturated solution as to readily control the strength of the combined liquids.

With these and other objects in view, the invention comprises the various features hereinafter described and more particularly defined in the claims.

The accompanying drawing illustrates the invention in its preferred form, in which:

Fig. 1 is a sectional view in elevation showing the mixing apparatus and the piping arrangement by which the flow of water and saturated chemical solution may be proportioned to obtain a cleaning solution of any desired concentration; it is taken on section line 1—1 of Fig. 2, and Fig. 2 is a horizontal sectional view taken on the section line 2—2 of Fig. 1.

Referring more in detail to the drawing, the numeral 2 designates a tank or metal container, preferably of cylindrical form, in which the solution of the chemical material takes place. The chemical material may be in powder form or in flake, granulated, cake or other suitable form which may be dissolved in water. It will be understood that the rate of solution depends to some extent on the physical form of the material to be dissolved and in general the more finely divided the material is, the more rapidly will the solution take place. The regulating valves, hereinafter described, may be suitably adjusted in position with variations in the rate of solution, but in the normal operation of the apparatus a saturated or nearly saturated solution is obtained in the dissolving tank.

The tank 2 is preferably provided with an opening 4, at the top thereof, through which the tank may be charged with the chemical material or cleaning agent to be used. The neck portion of the opening may be provided with a screw-threaded part on which a cap or cover member 6, having a corresponding threaded portion, may be screwed to tightly close the opening. A gasket 8 may be employed between the top of the neck portion and the inside of the cover member to tightly seal the joint between them.

The bottom of the container is preferably provided with a series of baffles 10, 12, 14 and 16 extending upwardly at right angles from the bottom of the container and extending inwardly from the side walls or periphery thereof. These baffle members preferably extend inwardly to a point about three-quarters of the distance to the center of the tank so as to leave the central portion free for placing a second baffle member or series of baffles, as 18, 20, 22 and 24, therein to assist in controlling the flow of water upwardly through the chemical material to be dissolved. The chemical material 28 rests on the screen 26 and as portions of the chemical are dissolved, the weight of the mass causes the material to sink or gradually subside to the screen so that the path of flow and the resistance to flow of the water remains substantially constant during formation of most of the solution.

Water is fed to the tank 2 from a pipe line 30 which is preferably connected to a pump 32, indicated diagrammatically, by which water may be forced under pressure through the main pipe line 34 and through the branch pipe 36 leading to the baffled compartment 38 at the bottom of the container 2, preferably near the periphery thereof.

In the main pipe section 34 is a spring-pressed valve member 40 by which resistance to the flow of water through the main branch 34 may be controlled. A valve member 42, preferably of a form which may be manually operated, is provided in the branch pipe 36, by which the rate of flow of water into the container 2 may be regulated, and by which in conjunction with the spring-loaded valve 40, the relative rates of flow, or the proportional flow may be determined so as to determine the concentration of the solution passing to the boiler and cleaning machine.

The water passing into the baffled compartment 38 through the opening 44 passes over the baffles and through the screen member 26 into contact with the chemical material 28 which dissolves therein at a rate depending on the temperature of the water and on the rate of solution of the chemical. It will be understood also that the rate of solution is dependent on the fineness of the chemical material and the area of contact of the water therewith. The water in passing in intimate contact with the chemical material becomes substantially saturated therewith in a relatively short time, so that by adding to the saturated solution a definite proportion of water, a cleaning solution of a definite predetermined strength or concentration may be readily obtained.

The water which has been saturated with the chemical material passes through the portion of the screen adjacent the outlet opening 46 of the outlet pipe 48 which is connected to the main branch pipe 34 at a point beyond the valve 40, and becomes diluted in a definite proportion with the fresh water flowing through the main branch 34, the united streams mixing thoroughly in the pipe 50 which passes to a boiler or to heating coils, not shown, by which the cleaning solution may be heated to the desired temperature for cleaning, usually 180 to 190 degrees Fahrenheit.

It will be apparent that by setting the spring-pressed valve 40 and regulating the position or set of the hand valve 42, any desired strength of solution between the limits of plain water, as obtained when the hand valve 42 is closed off and water is permitted to pass through the valve 40, and a saturated solution, as obtained when the hand valve 42 is fully open and the valve 40 is set so that water is not permitted to pass through the branch pipe 34.

The openings in the screen 26 may be of any suitable size, depending on the fineness of the chemical material to be held by the screen and the rate of flow of water through the openings is dependent to some extent on the size of the openings.

In the operation of the device, the valve 40 is generally first set so as to provide the desired amount of back pressure, and the set of the hand valve 42 is then regulated so that the desired strength of the outgoing cleaning solution will be obtained. It will be obvious that the concentration or strength of the final solution may be readily determined by means of a hydrometer at a given temperature and the valves above described may be regulated accordingly.

It will be understood that various changes or modifications may be made in the form of the invention as described without departing from the spirit or scope of the invention as defined in the claims.

Having thus described the invention, what is claimed as new is:

1. A method for the preparation of a chemical solution of predetermined strength which comprises passing a liquid in a stream, dividing the stream into a main stream and an upwardly directed branch stream, passing the liquid of said branch stream in a tortuous path below and adjacent a body of chemical material to form a substantially saturated solution, controlling the flow of liquid in the said branch stream in advance of contacting with the said chemical material, controlling the flow of liquid in the main stream so as to provide proportional flow between the main stream and the branch stream and uniting the said solution with the main stream to form the desired solution.

2. A method for the preparation of a chemical solution of predetermined strength which comprises passing water under pressure in a stream, dividing the water of said stream into a main stream and an upwardly directed branch stream, passing the water of said branch stream in a tortuous path below and adjacent a body of chemical material to form a substantially saturated solution, returning the solution of the branch stream to the water in the main stream, restricting the flow of water in the said branch stream in advance of contacting with the said chemical material, controlling the flow of water in the said main stream to provide the desired proportional flow between the main stream and the branch stream and maintaining pressure throughout the steps of dividing the stream and reuniting the branch stream and the main stream.

3. A mixing apparatus for forming a chemical solution of a predetermined strength which comprises a container, a lower compartment in said container having a series of baffles therein, an upper compartment in said container, a screen member supported on said baffles serving to separate the upper from the lower compartment and to hold a chemical material thereon, a main conduit for conducting liquid from a source of supply, a branch conduit for conducting liquid from the main conduit to the said lower compartment, at least a portion of the liquid passing from thence into the upper compartment into contact with at least a portion of the chemical material and back into the said lower compartment, a valve in said branch conduit for controlling the flow of liquid therein, an outlet conduit from said lower compartment to said main conduit and a valve in said main conduit positioned therein between the juncture of the branch conduit with the main conduit and the juncture of the outlet conduit with the main conduit.

4. A mixing apparatus for forming a chemical solution of a predetermined strength which comprises a container, a lower compartment in said container having a series of baffles therein, an upper compartment in said container, a screen member supported on said baffles serving to separate the upper from the lower compartment and to hold a chemical material thereon, a main conduit for conducting liquid from a source of supply, a branch conduit for leading liquid from the main conduit to the said lower compartment, at least a portion of the liquid passing from thence into the upper compartment into contact with at least a portion of the chemical material and back into said lower compartment, a valve in said branch conduit for controlling the flow of liquid therein, an outlet conduit from the said lower compartment to said main conduit, a valve in said main conduit positioned therein between the juncture of the branch conduit with the main conduit and the juncture of the outlet conduit with the main conduit, and pump means in said main conduit positioned therein in advance of the juncture of the branch conduit with the main conduit.

CHARLES R. KRETZSCHMAR.
AUGUST W. OFELDT.